United States Patent [19]
Brauer et al.

[11] 3,711,956
[45] Jan. 23, 1973

[54] METHOD OF OPERATING A FLUIDIZED BED REACTOR

[76] Inventors: Heinz Brauer, 1000 Berlin 37 Janickester. 65; Jochen Muhle, 1000 Berlin 41, Stierstr. 4, both of Germany

[22] Filed: Dec. 1, 1970
[21] Appl. No.: 94,002

[30] Foreign Application Priority Data

June 12, 1970 Germany..................P 20 30 049.6

[52] U.S. Cl....................................34/10, 263/21 A
[51] Int. Cl..........................F26b 3/10, F27b 15/00
[58] Field of Search......34/10, 57 R, 57 A; 263/21 A

[56] References Cited

UNITED STATES PATENTS

| | | | |
|---|---|---|---|
| 2,866,625 | 12/1958 | Sylvest | 34/10 |
| 3,052,990 | 9/1962 | Tailor | 34/57 A |
| 2,700,595 | 1/1955 | Probst | 34/57 A |
| 2,666,269 | 1/1954 | Parry | 34/10 |

*Primary Examiner*—John J. Camby
*Attorney*—John Lezdey

[57] ABSTRACT

A fluidized bed reactor, and a method of operating thereof, wherein fluidized material passes downwards and the fluidizing material passes upwards in countercurrent, having a plurality of superposed plates with common orifices for use in catalytic reactions, substance transfer processes and/or heat transfer processes.

17 Claims, 12 Drawing Figures

PATENTED JAN 23 1973

Inventors:
HEINZ BRAUER & JOCHEN MÜHLE
By John Lezdey
Attorney

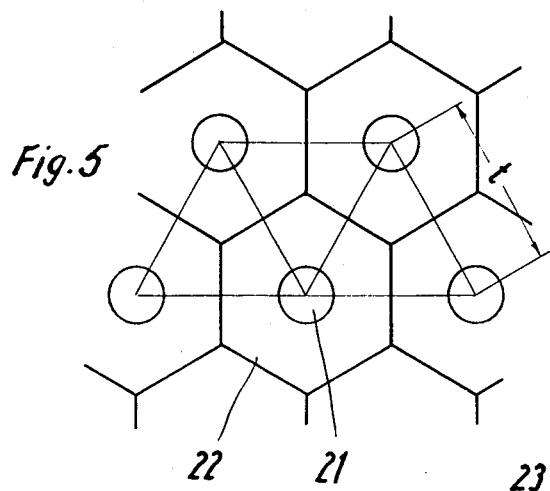
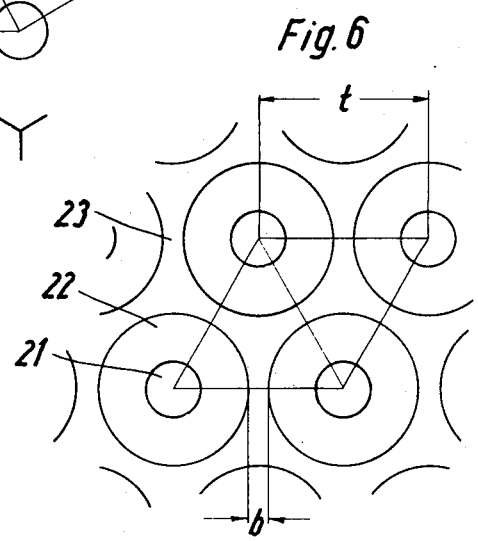
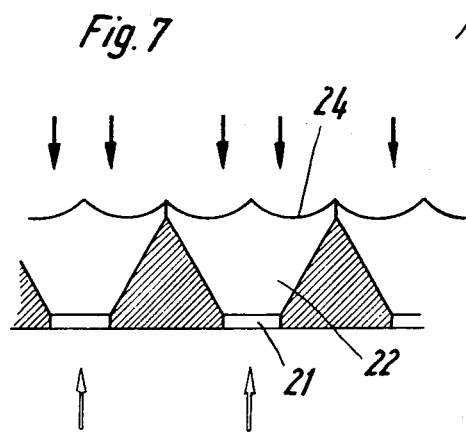
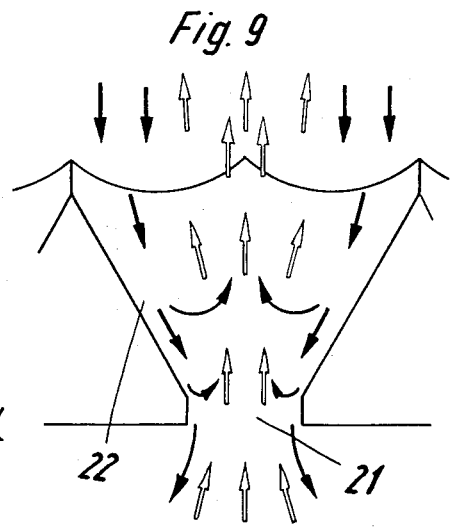

Inventors:
HEINZ BRAUER + JOCHEN MUHLE

METHOD OF OPERATING A FLUIDIZED BED REACTOR

This invention relates to an apparatus and a method of operating a fluidized bed reactor, through which the fluidized material flows downward and through which the fluidizing medium flows upward (in countercurrent to the fluidized material), with a plurality of superposed plates having many common orifices for the fluidizing medium and for the fluidized material, and the common orifices being distributed over the surface of the plates. The process is suitable for the treatment of fluidizable solids with gases and/or liquids in a countercurrent and, more particularly, for the continual conduct of heat transfer and substance transfer processes with and without chemical reactions.

Under certain very specifically limited conditions, powder or granular material referred to in this description will be called "fluidized material" and can be fluidized by means of a liquid or gaseous medium, the fluidizing medium. The fluidizing medium flows against the force of gravity through the said material and there is obtained a fluidized bed. This can be produced in containers of any shape and cross-section, generally including horizontal porous plates or grids which distribute fluidizing medium flowing through the apparatus as uniformly as possible. If, on the other hand, the velocity of the fluidizing medium is so low that the particles remain at rest, then the term "fixed bed" is used.

The fluidized bed is frequently preferred to the fixed bed when it is important to obtain good surface utilization and the thorough mixing of the ingredients in the process since the larger the available phase surfaces, the more effective are the catalytic reactions, for example, as well as the heat exchange or transformation of substances. The fluidization of the fluidized material also promotes the equilibration of temperatures and concentrations over the cross-section of the apparatus. However, with the fluidized bed reactors found in practice, these advantages are offset by disadvantages arising from the fact that the fluidizing medium and the fluidized material move at least partly in a direct current. Even when the fluidized material is moving on the average, in a direction opposite to the fluidizing medium, a considerable portion of the material still moves in the same direction as the fluidizing medium. Consequently, the temperature and partial pressure differences are less than in the case of a fixed bed where the countercurrent principle can be implemented almost completely. Furthermore, in fluidized beds with greater heights there is observed a noticeable backmix of the phases in the longitudinal direction of the apparatus as well as the formation of channels and dead zones, which considerably reduces the effectiveness of the exchange processes in the fluidizing beds.

This also applies to the above-mentioned type fluidized bed reactors where grids are distributed over the entire height of the reactor and are intended to produce a more uniform distribution of the fluidized material and the fluidizing medium in the uniform fluidized bed, as disclosed in German Pat. No. 1,208,736. In such reactors the fluidized material moves in a countercurrent flow in both directions through the grids.

These defects are extensively avoided in another known type construction fluidized bed reactors wherein a plurality of plates, permeable by the fluidizing medium, are superimposed one above the other; each plate being provided with a special lock for the passage of the fluidized material in the opposite direction, as disclosed in German Pat. No. 1,166,158. The said lock comes in the form of overflow pipes dipping into the next-lower bed layer. Admittedly this does result in a close approximation to the countercurrent process, when the process is carried out continuously, however, the flow conditions are complicated and the dimensions of the reactor must be coordinated with those of the overflow pipes, while taking into consideration the dimensions of the plates used. Such apparatuses are therefore difficult to adapt to variations in operating conditions. Furthermore, the locks impair the uniform throughflow through the fluidized bed and frequently considerably reduce the volume available for the fluidizing process. These apparatuses, therefore, have been hardly used in actual practice.

The invention, therefore, starts from the first-mentioned type of construction and is aimed at finding a way to combine the simple structure and sturdy operation of the reactors of this with the advantages of the countercurrent process.

The solution to this problem provided by this invention consists in the fact that these reactors are operated with such a limited throughput of fluidizing medium that separate stable fluidized beds will form on the individual plates while the fluidized material trickles over the entire cross-section of the apparatus through the same plate orifices through which the fluidizing medium flows in the opposite direction. This solution is contrary to the fact that the mean velocity of the fluidizing medium, related to the cross-sectional area of the orifices, is greater than the mean velocity of the fluidizing medium, related to the free cross-section available to the fluidized bed. If the fluidizing medium is in a position to raise the fluidized material to the fluidized bed already within the range of its lower velocity, then one had to assume that the material in the orifices through which the flow takes place at higher velocity would not be in a position to move in the opposite direction. Furthermore, it would be anticipated that the fluidized bed would collapse above those orifices in which the fluidizing medium would encounter higher resistance because of the downward-flowing material, whereas the fluidizing medium would break through above the other orifices without the formation of a fluidized bed.

Surprisingly, experience shows that this assumption is unjustified. The method according to this invention always facilitates stationary operation with equally large volumes of material per plate when a fluidized bed is produced on the lowest bed. In the stationary operation state, there is an equilibrium between the flow of material which passes through the plate of a certain fluidized bed and the material flowing in from the next higher plate. The size of this material flow is determined by the resistance of the plates used. The resistance depends mainly on the free cross-section of the plates but is also partly determined by the particles of the fluidized bed lying below and bouncing against the underside of the plate. The last mentioned factor is not present in the lowest plate of an installation with completely uniform plates. Here, accordingly, a larger volume of material could flow off than would be flowing in from the stage directly above. This would prevent the formation of a fluidized bed not only in the lowest stage but also in all of the other stages located above. These undesired effects can be avoided if special measures are taken to make sure that, as far as the material flow is concerned, the outlet resistance of the lowest fluidized bed unit is exactly as great as the inlet resistance. One very simple solution of this problem consists, for example, in making the perforations of the lowest fluidized bed plate somewhat smaller than those of the stages located above. Other measures, which would promote the development of a fluidized bed, are known from single-stage fluidized bed reactors. They are based mostly on a certain minimum pressure drop in the plate.

The advantages obtained through this invention consist in the fact that, in a multi-stage fluidized bed reactor a uniform countercurrent of fluidized material and fluidizing medium is achieved with the greatest possible utilization of the entire volume of the apparatus. In case a particular plate has been selected, a fluidized bed develops in each stage above a certain minimum throughput of the fluidizing medium and the relative interstice volume of which bed depends solely on the quantity flow of the fluidized medium and the characteristics of the particles used. The relationship between the quantity of fluidizing medium flowing and the formation of a fluidized bed is known. Undesired phenomena such as, for example, slugging, the formation of channels and dead zones, which occur especially in cases of large volumes of solid per unit of fluidized bed, can in a simple manner be avoided by the suitable selection of the stage intervals. The crossflow mixing in each fluidized bed is very intensive. It was found that the total pressure loss due to the larger plate orifices is less than in the conventional multi-stage fluidized beds with overflow pipes. In addition, a considerable simplification in construction can be obtained.

It is noted that in such a process the plate orifices cannot be arbitrarily small. Suitable orifice dimensions can be determined experimentally. It has now been determined according to this invention that particularly advantageous reference values for the ratio $\phi$ of the free orifice surface of a plate and its total surface can be obtained from the very beginning, as a function of the following quantities:

$w$ = mean velocity of the fluidizing medium related to the empty column cross-section;
$g$ = acceleration due to gravity;
$dp$ = mean particle diameter;
$pp$ = density of material being fluidized (solid);
$pm$ = density of fluidizing medium;
$k$ = a constant between 0.3 and 0.8, generally between about 0.5 and 0.6.

This relationship, which conversely also permits determination of a suitable air velocity for a given orifice ratio $\phi$, offers an indication as to the minimum value $\phi$ min of the orifice ratio:

$$\phi \min = K \cdot 1.5 \ w \ \sqrt{g \cdot dp \cdot pp/pm}$$

If this minimum orifice ratio is maintained, there can be ensured that countercurrents of the fluidizing medium and of the fluidized material can develop in the orifices, without normally one of the currents being completely eliminated by the other current on the average. This development of these countercurrents is furthermore promoted according to this invention by the fact that the orifices become wider toward the top, whereby the angle of expansion is preferably greater than 20 degrees. This latter feature takes into consideration the widening of the flow of the fluidizing medium amounting to about 10 degrees in connection with the narrowest orifice point and guarantees that, between this widening stream of medium and the widening wall, there will be room for the fluidized material which moves downward along this wall. The orifices are preferably of a circular cross-section. Furthermore, they should be distributed over the entire plate surface at substantially equal distances. Such a uniform distribution is obtained particularly when the orifices are arranged in the corners of equilateral triangles. A particularly favorable throughflow is obtained when the funnel-shaped widenings of adjacent orifices meet without any substantial intermediate horizontal surfaces, which has moreover, the well known advantage that practically all of the fluidized material will run out when the flow of the fluidizing medium is shut off. The slope of the widening surfaces for this purpose should correspond at least to the angle of repose.

According to this invention, reference values can finally be given for the ratio of the minimum orifice diameter $db$ to the maximum particle diameter $dp$ max as a function the the particle diameter; if this ratio is maintained, satisfactory operation can likewise be facilitated or permitted:

| $dp$ max | $dp$ max/$db$ |
|---|---|
| 0.03 – 0.3mm | 0.015 – 0.1 |
| 0.3 – 1 mm | 0.1 – 0.3 |
| more than 1 mm | 0.3 – 0.5 |

BRIEF DESCRIPTION OF THE DRAWINGS:

FIGS. 5 and 6 are partial top views of two plates with different orifice shapes;

FIG. 7 is a partial cross-section through a plate with an orifice shape corresponding to that of FIG. 5;

FIG. 8 is a schematic cross-section through a bed deep-drawn from sheet metal;

FIG. 9 is a cross-section through an orifice with a flow diagram indicated by arrows;

Figure 1:
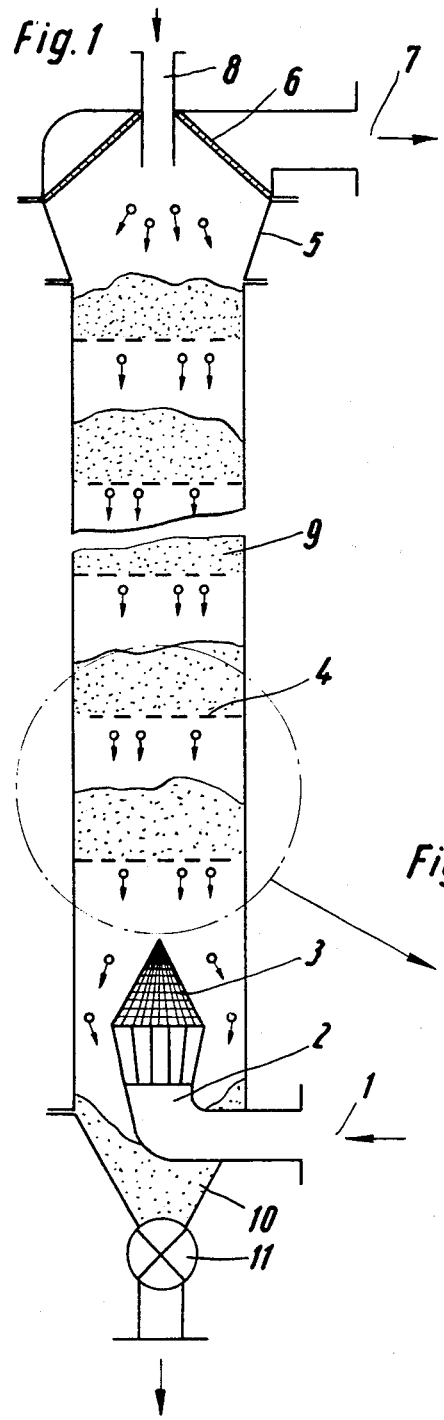
FIG. 1 is a longitudinal cross-section through the reactor.

In the reactor in FIG. 1, the fluidizing medium enters at point 1, via a diffuser 2, which is covered with a conical screen 3, into a cylindrical, multi-stage trickleplate fluidized bed column and uniformly flows through the individual stages 4 up to the head of the installation. Here, the mean velocity of the fluidizing medium is reduced by means of a diffuser-like flaring 5, and a conical screen 6 separates the particles from the downflowing fluidizing medium 7. The material is fed in at the head of the column at point 8, trickles through the individual fluidized beds 9 in countercurrent to the fluidizing medium and at the foot of the installation reaches a collecting hopper 10, where it is discharged via a lock device 11.

Figure 2:
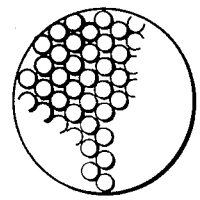
FIG. 2 is a top view of a plate.

In the fluidized plate illustrated in FIG. 2, we are dealing with one of many conceivable models of a perforated plate with uniformly distributed orifices. The latter are sufficiently large to permit the particles to trickle through unhindered.

Figure 3:
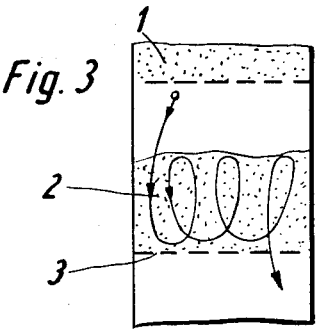
FIG. 3 is a fluidized bed unit.

FIG. 3 schematically illustrates the movement of a particle in a fluidized bed unit. The particle leaves the fluidized bed 1 through the plate and arrives in the fluidized bed 2. Here it completes several circular motions until it finally leaves the fluidized bed at point 3. In actual fact, the movement of the solid in the fluidized beds is much more complicated.

Figure 4:
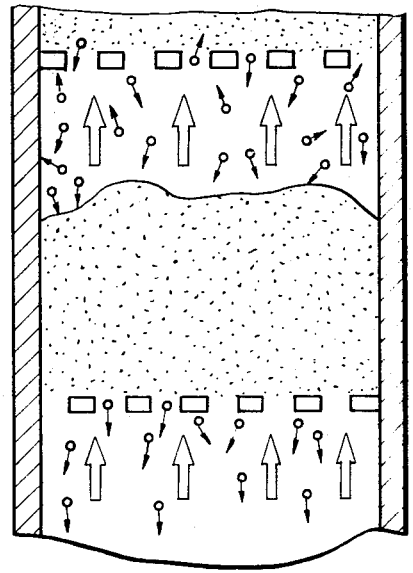
FIG. 4 is a fluidized bed unit shown on a larger scale.

This fact is explained in connection with the lowest fluidized bed unit of an installation, illustrated on a larger scale in FIG. 4. Here the large arrows designate the movement of the through-flow medium. The small arrows show in connection with the particles that their momentary directions of movement are by no means uniform. In terms of average time, however, we get a continual particle flow along the entire installation and this flow runs counter to the through-flow medium.

The embodiment according to FIG. 1 can be used not only with just a few but also with a very large number of plates. It is equally suited for material exchange processes, such as, for example, the drying of particle-shaped solids for catalytic reactions, as well as for heat transfer processes in which the particles are heated or cooled.

Figure 10:
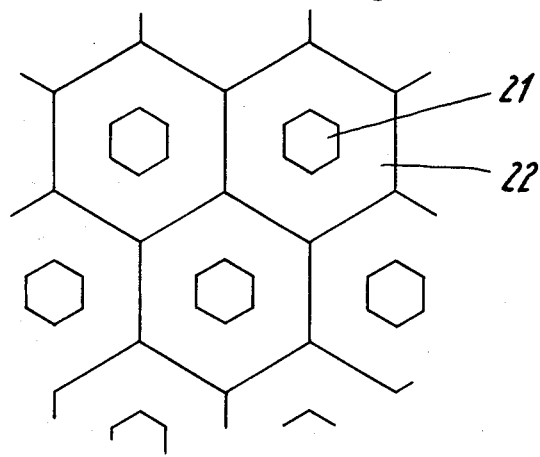
FIG. 10 is a top view of a plate with hexagonal orifices.

As we can see from all the top views (FIGS. 5, 6 and 10), the orifices 21 are disposed in the corners of equilateral triangles indicated by thin lines in FIGS. 5 and 6 with a pitch $t$. In the examples in FIGS. 5 and 6, the orifices are circular while, according to FIG. 10, they have the outline of a regular hexagon. Other cross-section forms may be used, for example, elongated orifices or concentric annular slots. For the formation of a uniform fluidized bed, uniformly distributed individual orifices have proved most advantageous. The circular form is preferable in case of production by machining, while the hexagonal contour offers the advantage that the likewise hexagonal funnel or hopper parts 22, which adjoin the orifices on top lie adjacent to one another at the same level without any horizontal surface portions remaining between them. When the funnels or hoppers have a circular cross-section, as in FIG. 6, horizontal surface portions 23 remain with minimum widths b or a figure as in FIGS. 7 or 9 occurs, i.e., the grids 24, which develop along the points of intersection of adjacent funnels or hoppers, do not lie in one plane. Of course, it is possible to have an orifice with a circular cross-section going into a hexagonal funnel, if this is desired and if the production equipment used permits. FIG. 7 shows a part of a solid plate in which the orifices have been cut or molded. FIG. 8 illustrates the situation in case of a plate made of sheet metal through deep-drawing. The honeycomb structure imparts a high degree of rigidity to the plate.

In all cases it is advisable to slightly round off or chamfer the orifices on the underside to reduce the pressure loss.

Figure 11:
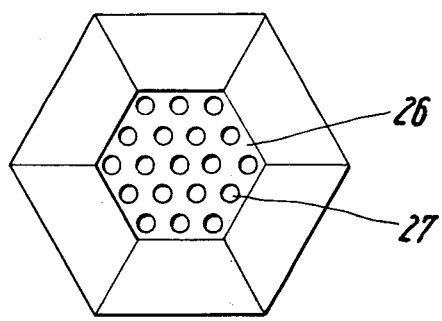
FIGS. 11 and 12 are a top view and a cross-section through a component used in making up a plate.
Figure 12:
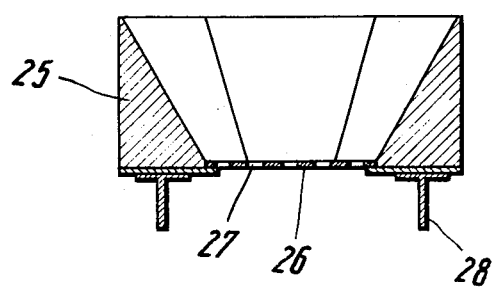

The plates can be made in one piece or as assemblies comprising several components. With the form of orifices according to FIGS. 5–10, the component parts are preferably made hexagonal with an opening in the center. Each component may also have a plurality of orifices. FIGS. 11 and 12 show a special form of embodiment for components with several orifices. The component 25 illustrated here is hexagonal and has a hexagonal funnel opening and at the narrowest part has a grid insert with a plurality of uniformly distributed orifices 27. A plurality, for example, seven of such components may be assembled to form one plate. They are maintained in position by a support grid 28. The grid inserts 26 can be held by the components or by the support grid or between the two of them in any suitable manner. The grid inserts are preferably interchangeable for adaptation to differing diameters of the solids or for different desired processing periods.

It should be noted generally with regard to the form of the orifices that the funnel-shaped widening is particularly advantageous when the particle size of the material being fluidized is small. When the particle size is small, it is possible to use simple perforated sheets wherein there is no such widening. It is advisable to use such simple perforated sheets when the average particle diameter is more than 1 mm, or preferably, more than 2 mm.

The best effect of the funnel-shaped widenings of the orifices may be explained now in connection with FIG. 9.

Here (as in FIG. 7) white arrows designate the path of the fluidizing medium and black arrows designate the path of the material being fluidized. The free jet of the fluidizing medium becomes wider after it has passed the narrowest point of the orifice with an angle of about 10°. The angle of widening of the funnel 22 (double the angle between the generatrix and the axis) is substantially greater, that is, more than 20°, and preferably more than 40°. As a result, there is a free space left between the free jet and the funnel wall in which the solid materials can travel downwards. With a sufficiently large widening angle a backflow of the fluidizing medium can develop in this space which helps in the transport of solid materials downward. It has been found that this form produces a more stabilizing effect with respect to the movement of solids in the individual fluidized bed stages and also brings about uniform fluidization.

Metals, glass, ceramic working materials, and plastics are particularly suitable as raw materials for the plates. Perforated sheets should preferably only be used if the plates are relative thin, if the bar widths between the individual plate orifices are substantially the same size as the particle diameters, and if the orifice and particle diameters are relatively large. On the other hand, orifices with funnel-shaped widenings are recommended particularly in the case of thick plates, during long processing times, and in the case of a relatively small particle diameter of, for example, 0.05–0.3 mm.

The fluidized bed reactor according to this invention shows a strikingly small pressure loss per stage, whereby the pressure loss on the plate is even less than in the fluidized bed. This is in striking contrast to the known plates where a certain minimum pressure loss was considered a prerequisite for the development of a stable fluidized bed.

Finally it should be noted that the reactor according to this invention is suited not only for gaseous but also for liquid fluidizing media. Three-phase systems can also be treated. In such a case, the liquid phase is associated with the material to be fluidized to the extent that it adheres to the solid particles or to the extent that it has such a droplet size to enable it to behave like the material being fluidized while in case of sufficiently fine distribution and small droplet size it is carried along by the fluidizing medium and then, in case of application of the above considerations and formulas, belongs to the fluidizing medium.

In all figures, white arrows (drawn only in outline) refer to the path of the fluidizing medium, while the black arrows indicate the path of the material being fluidized. Obviously, the embodiments shown are exemplary only and a wide variety of embodiments may be devised without departing from the spirit and scope of the invention.

What is claimed is:

1. In combination with a fluidized bed reactor through which material being fluidized flows downwards and fluidizing medium upwards, a plurality of superposed plates having many common orifices for the fluidizing medium and for the material being fluidized distributed over the plate surface, wherein the minimum ratio of the free orifice surface area of a plate to the total surface area of the plate $\phi$ min as given by the formula:

$$\phi \min = K \cdot 1.5 \, w / \sqrt{g \cdot dp \cdot pp/pm}$$

wherein $K$ is a constant from 0.3 to 0.8;
   $w$ represents the mean velocity of the fluidizing medium in relation to the empty column cross-section;
   $g$ represents the acceleration due to gravity;
   $dp$ represents the mean particle diameter;
   $pp$ represents the density of the material being fluidized;
   $pm$ represents density of the fluidizing medium.

2. The combination of claim 1, wherein said orifices widen upwards.

3. The combination of claim 2, wherein the angle of widening is greater than 10°.

4. The combination of claim 2, wherein the widenings are substantially funnel-shaped and the widening funnels of adjacent orifices meet one another substantially without any horizontal intermediate surfaces.

5. The combination of claim 1, wherein said orifices are of circular cross-section.

6. The combination of claim 1, wherein said orifices are of hexagonal cross-section.

7. The combination of claim 1, wherein said orifices are distributed over the whole of said plate surface at substantially equal distances apart.

8. The combination of claim 1, wherein the basic values for the ratio of the smallest orifice diameter $db$ to the largest particle diameter $dp$ max of the formula $dp$ max/$db$ for a $dp$ max of from 0.3 – 1 mm is from 0.1 – 0.3.

9. The combination of claim 1, wherein the basic values for the ratio of the smallest orifice diameter $db$ to the largest particle diameter $dp$ max of the formula $dp$ max/$db$ for a $dp$ max of over 1 mm is 0.3 – 0.5.

10. The combination of claim 1, wherein said plate is assembled from a multiplicity of components each having orifices between said components.

11. The combination of claim 10, wherein the contour of said components is a regular hexagon.

12. The combination of claim 10, wherein each of said plates has conical downwardly narrowing orifices and at the narrowest point of said orifices a thin sheet is disposed having a multiplicity of uniformly distributed orifices.

13. The combination of claim 10, wherein each of said plates has a support system holding said components.

14. The combination of claim 1, wherein said orifices are chamfered at the lower edge.

15. The combination of claim 1 wherein the outlet resistance of the lowest plate for the fluidized material is as great as the inlet resistance.

16. The combination of claim 1 wherein the orifices of the lowest plate are somewhat smaller than those of the plate lying above.

17. In a method of operating a fluidized bed reactor, the improvement which comprises flowing material being fluidized downwards and flowing fluidizing medium upwards, through a plurality of superposed plates having many common orifices distributed over the plate surface, the minimum ratio of the free orifice surface area of a plate to the total surface area of the plate $\phi$ min being given by the formula:

$$\phi \min = K \cdot 1.5 \, w / \sqrt{g \cdot dp \cdot pp/pm}$$

wherein
   $K$ is a constant from 0.3 to 0.8;
   $w$ represents the mean velocity of the fluidizing medium in relation to the empty column cross-section;
   $g$ represents the acceleration due to gravity;
   $dp$ represents the mean particle diameter;
   $pp$ represents the density of the material being fluidized; and
   $pm$ represents the density of the fluidizing medium,
whereby the throughput of the fluidizing medium flowing through the plate in countercurrent to the fluidized material is restricted to such an extent that separate stable fluidized beds form on the individual plates.

* * * * *